United States Patent [19]

Mansur et al.

[11] Patent Number: 4,845,437
[45] Date of Patent: Jul. 4, 1989

[54] SYNCHRONOUS CLOCK FREQUENCY CONVERSION CIRCUIT

[75] Inventors: Robert P. Mansur, Chelmsford; Imtiaz I. Piracha, Billerica, both of Mass.

[73] Assignee: Minolta Camera Kabushiki Kaisha, Osaka, Japan

[21] Appl. No.: 753,225

[22] Filed: Jul. 9, 1985

[51] Int. Cl.[4] .................. H03K 1/17; H03K 17/00; H03K 5/13; H03B 19/00

[52] U.S. Cl. ........................... 328/15; 328/63; 328/72; 307/269; 307/271; 377/78

[58] Field of Search .................. 328/63, 72, 109, 179, 328/14, 15; 307/269, 271, 529; 377/47, 48, 110, 111, 78, 126; 375/107, 111, 118, 106; 370/100, 58, 108

[56] References Cited

U.S. PATENT DOCUMENTS

| | | | |
|---|---|---|---|
| 3,005,960 | 10/1961 | Levenson | 328/15 |
| 3,024,417 | 3/1962 | Secretan | 328/63 |
| 3,863,224 | 1/1975 | Alexander | 377/47 |
| 3,995,119 | 11/1976 | Pachynski, Jr. | 370/100 |
| 4,133,981 | 1/1979 | Kibler | 370/100 |
| 4,189,622 | 2/1980 | Foshee | 370/100 |
| 4,234,849 | 11/1980 | Cully, Jr. | 377/110 |
| 4,454,486 | 6/1984 | Hasson et al. | 328/14 X |
| 4,556,984 | 12/1985 | Genrich | 377/47 |
| 4,573,173 | 4/1986 | Yoshida | 328/63 |
| 4,604,582 | 8/1986 | Strenkowski et al. | 328/63 |
| 4,684,897 | 8/1987 | Richards et al. | 328/15 X |

FOREIGN PATENT DOCUMENTS 0125768 3/1983 European Pat. Off. .
1033874 3/1965 United Kingdom .
2030745B 7/1979 United Kingdom .

Primary Examiner—Stanley D. Miller
Assistant Examiner—Timothy P. Callahan
Attorney, Agent, or Firm—Burns, Doane, Swecker & Mathis

[57] ABSTRACT

A conversion system that provides compatibility between the internal system bus architecture of one computer and an external bus that operates on a different frequency includes a clock logic circuit for generating a clock signal that is synchronized with the internal clock for the computer system. The clock circuit includes a delay line that provides a plurality of phase displaced signals at the operating frequency of the computer system. Each of these phase displaced signals is multiplexed in accordance with the relationship of its phase to that of a signal at the clock frequency of the external bus. By multiplexing the phase displaced signals in the appropriate manner, pulses are generated with a time period corresponding to that of the desired external bus clock frequency.

11 Claims, 3 Drawing Sheets

SYNCHRONOUS CLOCK FREQUENCY CONVERSION CIRCUIT

BACKGROUND OF THE INVENTION

The present invention is generally directed to computers, and more particularly is concerned with a conversion system for providing portability of hardware modules between computer systems based on different architectures.

With the rapid advances presently being made in the semiconductor industry, personal and other desktop computers are becoming more and more popular. This increased popularity is accompanied by a proliferation of the number of different types of computers that are available to the consumer. Often, a consumer will buy one type of computer because it provides certain desirable features, e.g. a dedicated word processing system. However, that consumer may also wish to have available to him features that are associated with a different manufacturer's personal computer system. Even if the two types of computers can operate with the same application software, they may not be hardware compatible in that information or features available on one cannot be readily processed by the other.

One feature that distinguishes many different types of computer systems is the rate at which data is transmitted and processed within the system. For example, one computer might operate at a speed of 8 MHz, whereas another might operate at a speed of only about 4.8 MHz. In such an event, information being produced by one computer will appear to be asynchronous to the other computer. Accordingly, when one type of computer system is to operate with a hardware module designed for the other, there is a need for asynchronous logic. This logic causes an information event from one computer to be held until a clock pulse occurs from the timing system of the other computer. Such a requirement can introduce a one or two clock cycle delay in order to catch events of interest.

Other instances of a hardware incompatibility include features that may be internal to the central processing unit of one computer but external devices on the other. Because these features do not have identical architectures, the computer having the integral features must be capable of addressing similar features at an external location in order to provide compatibility.

OBJECTS AND BRIEF STATEMENT OF THE INVENTION

It is therefore a general object of the present invention to provide a novel conversion system that enables information and processing features designed for one computer system to be used in a second computer system.

It is a more specific object along these lines to provide a novel clock signal generating circuit that produces a signal at one frequency that is synchronized with a clock signal at a different frequency.

In accordance with the present invention, these objects and their attendant advantages are achieved by means of a conversion system that provides compatibility between the internal system bus architecture of one computer and an external bus that operates on a different frequency. An important feature of this conversion system is a clock generating circuit that provides a clock signal for the external bus that is synchronized with the internal clock for the computer system. The clock circuit includes a delay line that provides a plurality of phase displaced signals at the operating frequency of the computer system. Each of these phase displaced signals is multiplexed in accordance with the relationship of the phase of each to the phase of a signal at the clock frequency of the external bus. By multiplexing the phase displaced signals in the appropriate manner, pulses are generated with a time period corresponding to that of the desired external bus clock frequency.

The synchronized external bus clock enables events of interest to be captured faster, and hence provides greater efficiency than systems which utilize asynchronous logic.

Further features of the invention and the advantages provided thereby are explained in detail hereinafter with reference to preferred embodiments of the invention illustrated in the accompanying drawings.

DETAILED DESCRIPTION

In the following description of a preferred embodiment of the invention, particular reference is made to the example of two computer systems which respectively operate at approximately 4.8 MHz and 8 MHz, in order to facilitate an understanding of the invention. It will be appreciated, however, that the practical applications of the invention are not limited to this specific embodiment. Rather, the basic principles underlying the invention can be utilized to provide compatability between two systems that operate at many different frequencies.

Figure 1:
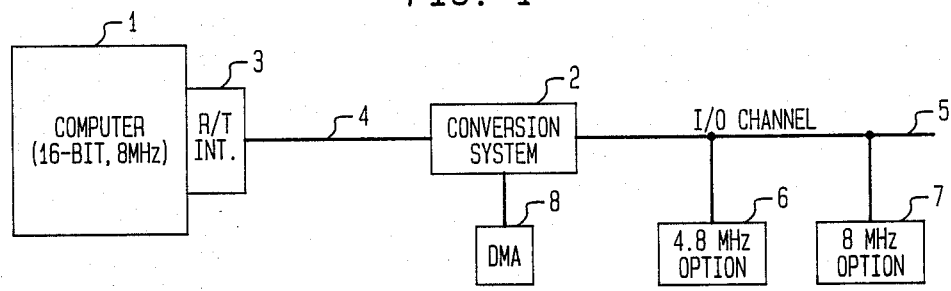
FIG. 1 is a block diagram of a computer system incorporating a conversion system to expand its capabilities.

Referring to FIG. 1, one possible computer hardware layout to which the present invention might be applicable is illustrated in block diagram form. In this example, the computer 1 which forms the basic component of the system has a 16-bit CPU which operates at 8 MHz. For example, the CPU could be an Intel 80186 microprocessor. This type of device includes a built in DMA (direct memory access) controller, timers and an interrupt controller.

It may be desirable to expand the capabilities of this computer to provide access to features available with a computer that is based upon a different type of microprocessor, for example an Intel 8088. This type of microprocessor operates at approximately 4.8 MHz and processes only 8 bits of data at a time. Accordingly, in order to enable information to be exchanged between the two types of computer systems, it is necessary to provide a conversion system 2 which converts the information from one computer into a format that is useable by the other.

A receive/transmit interface 3 connected to the internal bus of the computer 1 places signals from the bus onto a cable 4 connected to the conversion system 2, as well as receives signals from the conversion system 2 and provides them to the computer. The interface 3 includes bidirectional drivers and receivers that control the direction and flow of information between the computer 1 and the cable 4. It can also include suitable line termination resistors and the like to avoid signal reflection and thereby reduce noise.

The conversion system 2 receives multiplexed 16-bit, 8 MHz information on the cable 4 and converts it into demultiplexed 8-bit information at a 4.8 MHz reference frequency. This information is placed on an I/O channel 5 for transmission to an option board 6 that processes data in this format, for example a modem. Similarly, information placed on the I/0 channel by the external board 6 is converted into a format suitable for use by the computer 1.

In addition to the option board, the expansion system can provide other capabilities for the computer as well. For example, if it is desireable to utilize 16-bit, 8 MHz options which are designed for the computer 1 but are not capable of being physically located in the computer because all available option card slots are full, the I/0 channel 5 can be provided with a bus extension that provides a sufficient number of conductors to accommodate the 16 bits of information at once. Thus, the computer 1 can utilize option boards 7 that are located external thereto. In this case, the conversion system would not reformat the information being transmitted between the computer and the option board 7.

Another aspect of the expansion system resides in the provision of external features that are also located within the computer. For example, as noted previously the 80186 microprocessor has a built-in DMA controller. However, application software or other hardware options, e.g. a local area network board, designed for the 8088 microcomputer might attempt to access an external DMA chip. In order to emulate the capabilities of the 8088-microprocessor based system it is necessary to provide an external DMA controller 8. This controller can be connected to the conversion system 2 for access by the computer 1. With this arrangement, the external DMA controller 8 can function as a bus master, controlling the flow of information between memory within the computer 1 and an option board connected to the I/O channel 5.

Figure 2:
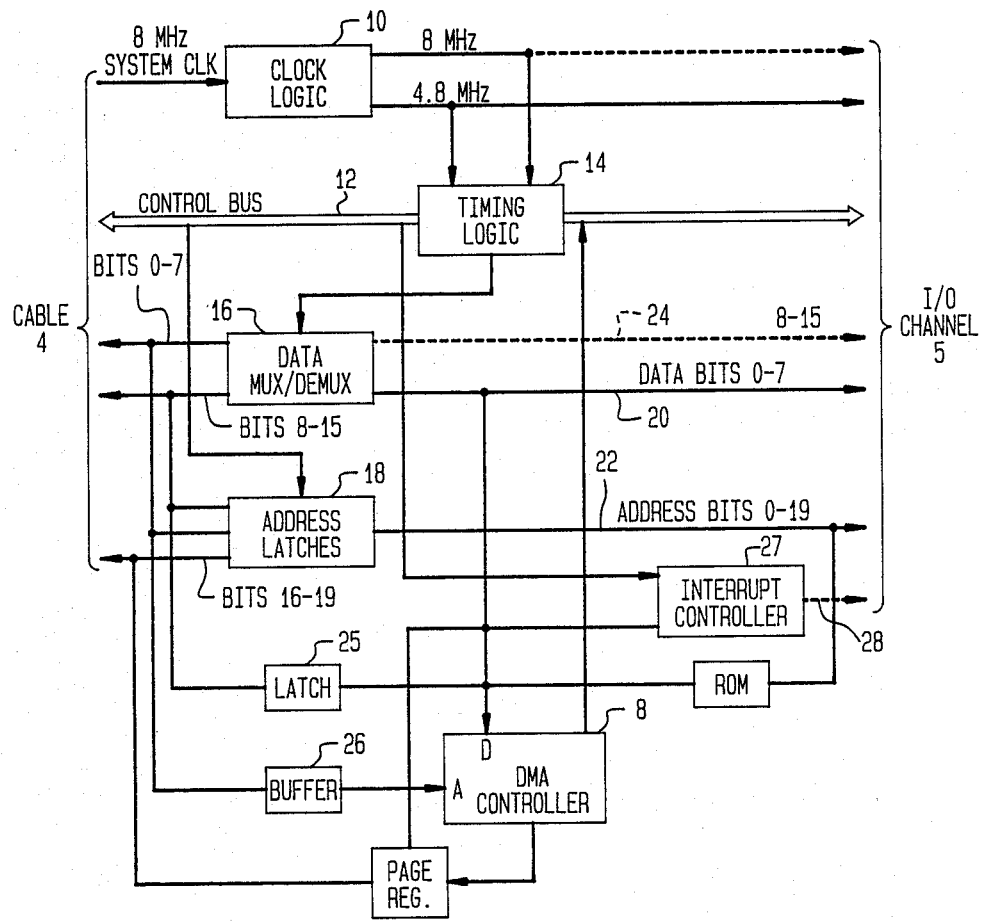
FIG. 2 is a functional block diagram of the conversion system.

The conversion system 2 is illustrated in block diagram form in FIG. 2. It includes a clock logic circuit 10 which receives the 8 MHz system clock signal from the computer 1 and generates a synchronized 4.8 MHz signal for use in converting information from one format to the other. In this regard, control signals present on a control bus 12 are presented to a timing logic circuit 14. Within the timing logic circuit, these control signals, for example read and write signals, are time shifted as they pass from the cable 4 to the I/O channel 5, and vice versa, to be in proper synchronism with the appropriate clock signal.

In the example being described herein, it is assumed that in the computer 1 the address and data bits are multiplexed on the same bus, whereas the I/O channel 5 requires separate address and data busses. Accordingly, the conversion system includes a data multiplexer/demultiplexer 16 and address latches 18 for extracting the address and data information from the cable 4 at appropriate times and placing it on separate busses 20 and 22 of the I/O channel. Similarly the multiplexer/demultiplexer 16 and the address latches 18 operate to combine the separately presented pieces of information on the busses 20 and 22 and present them in multiplexed form to the cable under control of signals from the control bus 12 and the timing logic 14. The multiplexer/demultiplexer 16 also converts the 16-bit data signals from the computer 1 into a multiplexed 8-bit format for presentation to the data bus 20, as well as demultiplexes data on the bus 20 for presentation to the computer in a 16-bit format. For those situations in which the computer accesses an external 16-bit, 8 MHz option board on the I/O channel, such as the board 7, the I/O channel can be provided with a second 8-bit data bus 24. Thus, data can be presented to the external board in a 16-bit format.

To provide access to the DMA controller 8, the conversion system includes an additional latch 25 and a buffer 26 which extract information from the 16-bit computer signal and present it to the controller as appropriate address and data signals.

To provide additional interrupt signals that can be used by 8 MHz option boards, an interrupt controller 27 can be included within the conversion system 2. This controller is responsive to data information to provide interrupts to the external board on a line 28.

Figure 3:
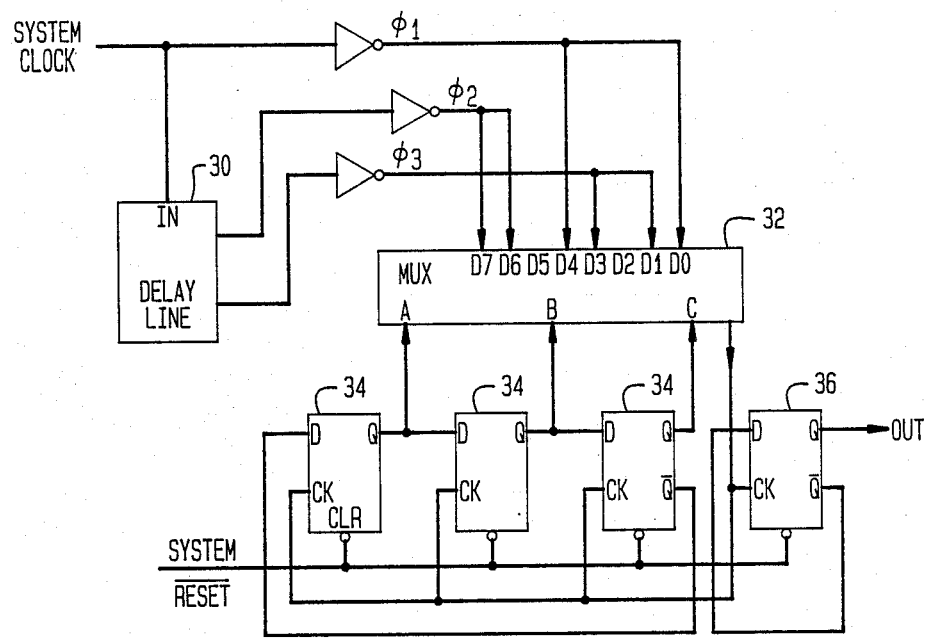
FIG. 3 is a schematic diagram of a circuit for deriving a synchronized 4.8 MHz clock signal from an 8 MHz system clock.

Referring to FIG. 3, the details of the clock logic circuit 10 for generating a 4.8 MHz output signal that is synchronized with an 8 MHz system clock is illustrated. The period of the 8 MHz signal is 125 nanoseconds, whereas that for the desired 4.8 MHz output signal is approximately 208 nanoseconds in length. Accordingly, to generate the desired frequency, five 125 ns periods must be converted to three 208 ns periods.

To accomplish this, the system clock signal is fed to an input terminal of a multiple output delay line 30. In the present example, the delay line 30 produces two output signals which are respectively delayed by approximately 42 nanoseconds (120°) and 83 nanoseconds (240°) from the input signal. The original system clock, labelled $\phi_1$, and the two delayed signals, respectively labelled $\phi_2$ and $\phi_3$, are applied to the input terminals of a multiplexer 32. In the illustrated embodiment the multiplexer comprises an 8:1 multiplexing device, and the three input signals are each respectively applied to two of the input terminals D0–D7 of the multiplexer. The remaining two input terminals, in this case, $D_2$ and $D_5$, are unused. For example, they could be grounded or connected to a constant voltage source.

The output signal from the multiplexer provides a clocking signal to a divide-by-six moebius counter comprised of three D-type flip-flops 34 connected in series. The output signal from the multiplexer is also fed as a clocking signal to a divide-by-two counter 36 comprised of a single D-type flip-flop. The output signal from this flip-flop comprises the synchronized 4.8 MHz signal.

Figure 4:
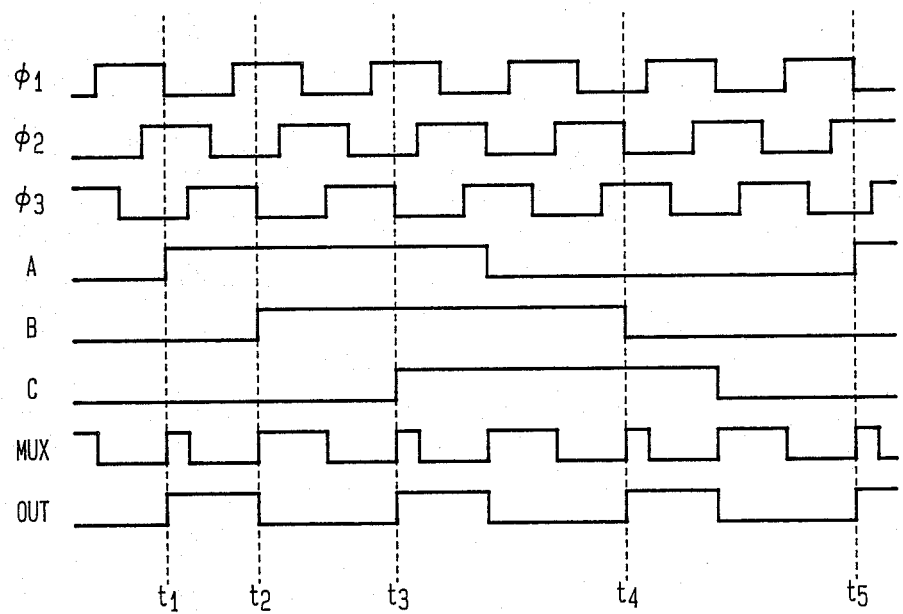
FIG. 4 is a timing chart illustrating the relationship of various signals generated in the circuit of FIG. 3.

The operation of the circuit illustrated in FIG. 3 can best be understood with reference to the timing diagram of FIG. 4. The three flip-flops 34 of the moebius counter provide a three-bit selection control to the multiplexer 32. These three bits determine which one of the eight data input terminals D0–D7 is to be connected to the multiplexer's output terminal. Each of the flip-flops is clocked at the rising edge of the output signal from the multiplexer 32. This output signal is inverted relative to the input signal received at the data terminal being connected to the output terminal.

Referring to the initial state in which the three bits of the divide-by-six counter are all low, i.e. binary zero, the D0 input terminal is connected to the output terminal of the multiplexer. This input terminal receives the $\phi_1$ signal comprised of the basic system clock. At the falling edge of this signal, denoted $t_1$ in FIG. 4, the output signal from the multiplexer 32 goes high and clocks each of the flip-flops 34. At this time, the least significant bit A of the three-bit selection control from the counter goes high to designate input terminal $D_1$. This terminal receives the $\phi_3$ signal, i.e., the system clock signal delayed by approximately 83 nanoseconds or 240°. Accordingly, this delayed signal now appears in inverted form at the output terminal of the multiplexer. Upon the next falling edge in the $\phi_3$ signal at time $t_2$, the counter is again clocked and the second most significant bit, B, in the selection control goes high to designate input terminal $D_3$. This input terminal also receives the $\phi_3$ delayed clock signal, and so this signal continues to appear at the output terminal of the multiplexer 32.

Upon the next falling edge in the $\phi_3$ signal, at time $t_3$, the counter is again clocked and the most significant bit C goes high to indicate the $D_7$ input terminal. This terminal receives the $\phi_2$ signal which is delayed by 480° (360°+120°) relative to the system clock signal. This signal appears at the output terminal of the multiplexer for the next two cycles, i.e., while input terminals $D_7$ and $D_6$ are designated. Upon the second falling edge in $\phi_2$ input signal, at time $t_4$, the control signal switches from 110 to 100, designating input terminal $D_4$ which receives the undelayed $\phi_1$ system clock signal. This completes one total cycle in the operation of the multiplexer.

The output signal from the multiplexer, labelled MUX in FIG. 4, has an overall frequency of 9.6 MHz, i.e., twice the desired frequency. This result is due to the fact that the three input signals are each applied to two data input terminals of the multiplexer. The output signal from the multiplexer is clocked into the divide-by-two flip-flop 36, which produces a 4.8 MHz signal at its Q (true) output terminal. This 4.8 MHz signal is synchronized with the 8 MHz system clock. More particularly, the rising edge of the 4.8 MHz signal is aligned with a corresponding edge of the system clock at $t_1$, and the next two rising edges at $t_3$ and $t_4$ maintain a steady phase relation with edges in the system clock. At time $t_5$, the edges of the two clock signals are once again aligned. Thus, three clock pulses are produced for every five cycles in the system clock signal.

It is possible to apply each of the three phase-displaced clock signals $\phi_1$-$\phi_3$ to only one data input terminal of the multiplexer 32 and utilize a divide-by-three counter to provide the control signal, and thereby obtain a 4.8 MHz signal directly at the output terminal of the multiplexer. However, this type of operation could result in some unwanted transitions in the output signal. For this reason, the use of six data input terminals and a divide-by-six counter is preferred, to insure that the two input clock signals among which the selection is being made are both at the same logic level at the time of switching.

As can be seen in FIG. 4, the 4.8 MHz signal that is produced by the flip-flop 36 is not perfectly square, in that the high and low portions of each cycle are not equal. More particularly, the high period of the cycle ($t_2$-$t_1$) has a duration of about 83 nanoseconds whereas the low portion of the cycle ($t_3$-$t_2$) lasts for about 125 nanoseconds.

From the foregoing it can be appreciated that the operating principle of the clock generating circuit can be applied to the production of other frequencies as well. Basically, it involves providing phase-displaced versions of the original clock signal and selection of the one of those signals whose phase corresponds to a signal at the frequency to be generated. The magnitude of the phase displacement is related to the difference in the periods of the original and resulting signals. For example, as noted above, the generation of a 4.8 MHz signal from an 8 MHz signal involves adding 240° to each cycle. Accordingly, the phase displacements that are produced are integer multiples of this difference.

With slight modification, the circuit of FIG. 1 can be used to generate a 6 MHz signal that is synchronized with the 8 MHz system clock. In this case, the difference in the periods of the two signals is approximately 42 nsec, or 120°. Accordingly, the same phase displaced signals $\phi_1$-$\phi_3$ can be used, and they are selected in a different order to produce the 6 MHz signal. More particularly, the data input terminals of the multiplexer are connected as follows:

| Terminal | Signal |
|----------|--------|
| D0 | $\phi_1$ |
| D1 | $\phi_3$ |
| D2 | (not used) |
| D3 | $\phi_2$ |
| D4 | $\phi_2$ |
| D5 | (not used) |
| D6 | $\phi_3$ |
| D7 | $\phi_1$ |

Figure 5:
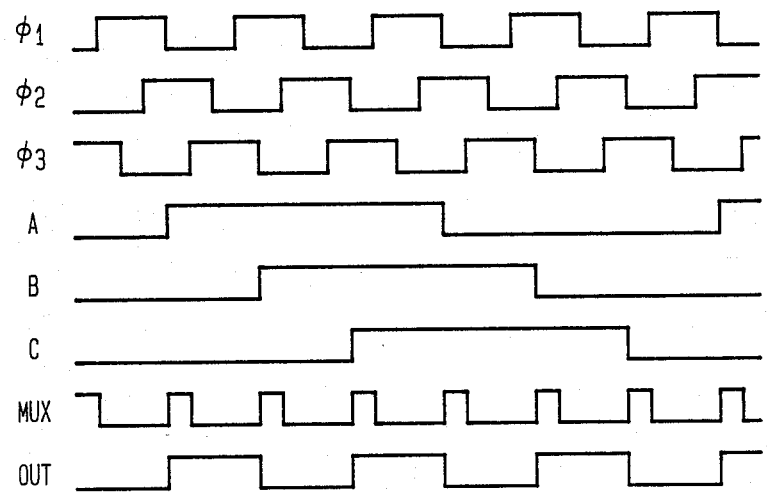
FIG. 5 is a timing chart for a circuit similar to that of FIG. 3 which has been modified to generate a 6 MHz clock signal from an 8 MHz system clock.

A timing chart illustrating the operation of the circuit when connected in such a fashion is shown in FIG. 5. As can be seen, upon each clocking signal to the divide-by-six counter, the phase displaced signals $\phi_1$, $\phi_2$ and $\phi_3$ are selected in succession to produce a 12 MHz signal. This signal is divided by two to generate the desired 6 MHz signal. In this particular case, the signal turns out to be a square wave.

It can be seen that the three phase-displaced signals $\phi_1$-$\phi_3$ provide five falling edges during each cycle of the system clock. These edges can be selected in a number of different manners to provide output signals of different frequencies. Furthermore, by varying the length of the phase displacement, other combinations of edges become possible to produce yet a greater range of output frequencies.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Apparatus for generating a first clock signal having a first predetermined frequency that is synchronized with a second clock signal having a different frequency, comprising:

means for providing a plurality of signals at said different frequency that are displaced in phase relative to one another; and selecting means, including a multiplexer having a plurality of input terminals respectively receiving said plurality of phase-displaced signals, and logic means responsive to a signal at an output terminal of said multiplexer for controlling said multiplexer to sequentially select the phase displaced signals at said input terminals, one at a time, and apply them to said output terminal to provide a clock signal at said first predetermined frequency.

2. The apparatus of claim 1 wherein the difference between the periods of said first and second clock signals is an integer multiple of the phase delays between said phase displaced signals.

3. The apparatus of claim 2 wherein said first clock signal has a frequency of about 4.8 MHz and said second clock signal has a frequency of about 8.0 MHz and wherein said phase displacement providing means provides three signals that are displaced in phase from one another by approximately 42 nanoseconds.

4. A method for generating a first clock signal at a predetermined frequency that is synchronized with a second clock signal at a second frequency and has a substantially constant duty cycle, comprising the steps of
providing a plurality of signals at said second frequency that are displaced in phase relative to one another; and,
multiplexing said plurality of signals in accordance with the respective phases of each of said plurality of signals to produce a composite signal having said predetermined frequency.

5. The method of claim 4 wherein said multiplexing step includes periodically selecting the one of said plurality of signals that has a phase which coincides with the phase of a signal at said predetermined frequency.

6. A system for expanding the capabilities of a computer which operates at a first predetermined operating frequency by providing hardware compatibility with a computer system that operates at a second predetermined frequency, comprising:
means for receiving a signal at said first predetermined frequency and generating a signal at said second predetermined frequency that is synchronized with said signal at said first frequency and has a substantially constant duty cycle;
an input/output channel; and
means responsive to said generating means for receiving signals from said computer at said first operating frequency and for presenting them on said channel in synchronism with said signal at said second predetermined frequency.

7. The system of claim 6 wherein said generating means comprises:
means for providing a plurality of phase displaced signals at said first frequency; and
means for periodically selecting the one of said phase displaced signals whose phase coincides with the phase of a signal at said second frequency.

8. The system of claim 6 wherein said generating means comprises:
means for providing a plurality of phase displaced signals at said first frequency; and
means for multiplexing said phase displaced signals in a predetermined sequence to produce said signal at said second frequency.

9. Apparatus responsive to a signal at one frequency for generating a synchronized signal at another frequency, comprising:
means for providing a plurality of signals at said one frequency, said signals being displaced in phase relative to one another by an amount related to the difference in the lengths of the periods of said one frequency and said other frequency;
a multiplexing switch having a plurality of input terminals respectively receiving said plurality of signals and an output terminal connected to one of said input terminals; and
means including a moebius counter that is triggered in response to changes in the level of the signal at said output terminal for controlling said switch to selectively connect said output terminal to each of said input terminals in a predetermined sequence to produce a signal at said output terminal that has a frequency related to said other frequency.

10. The apparatus of claim 9 wherein said switch has a number of input terminals that is at least twice the number of phase-displaced signals at said one frequency, and wherein said phase-displaced signals are respectively received at each of two of said input terminals.

11. Apparatus for generating a first clock signal at a predetermined frequency that is synchronized with a second clock signal at a second frequency, comprising:
means for providing a plurality of signals at said second frequency that are displaced in phase relative to one another; and
means including a multiplexer having a plurality of input terminals respectively receiving said plurality of phase-displaced signals, and logic means responsive to a signal at an output terminal of said multiplexer for controlling said multiplexer to select the signals at said input terminals and apply then to said output terminal in a preselected sequence to produce a composite signal having said predetermined frequency.

* * * * *